United States Patent
Kim et al.

(10) Patent No.: US 9,412,157 B2
(45) Date of Patent: Aug. 9, 2016

(54) APPARATUS AND METHOD FOR HIGH SPEED FILTERING OF IMAGE FOR HIGH PRECISION

(75) Inventors: Yong Sun Kim, Yongin-si (KR); Hwa Sup Lim, Hwaseong-si (KR); Kee Chang Lee, Yongin-si (KR)

(73) Assignee: SAMSUNG ELECTRONICS, CO., LTD., Gyeonggi-Do (KR)

( * ) Notice: Subject to any disclaimer, the term of this patent is extended or adjusted under 35 U.S.C. 154(b) by 448 days.

(21) Appl. No.: 13/067,601

(22) Filed: Jun. 13, 2011

(65) Prior Publication Data

US 2012/0045143 A1 Feb. 23, 2012

(30) Foreign Application Priority Data

Aug. 19, 2010 (KR) .................... 10-2010-0080146

(51) Int. Cl.
*G06K 9/38* (2006.01)
*G06K 9/40* (2006.01)
*G06T 5/20* (2006.01)
*G06T 5/00* (2006.01)

(52) U.S. Cl.
CPC . *G06T 5/20* (2013.01); *G06T 5/001* (2013.01); *G06T 5/002* (2013.01); *G06T 5/003* (2013.01)

(58) Field of Classification Search
USPC .................. 382/254, 260, 264, 266, 268
See application file for complete search history.

(56) References Cited

U.S. PATENT DOCUMENTS

| | | | |
|---|---|---|---|
| 5,367,385 A * | 11/1994 | Yuan | 358/465 |
| 7,110,612 B1 * | 9/2006 | Wang | 382/262 |
| 7,203,234 B1 * | 4/2007 | Zeng | 375/240.03 |
| 7,539,352 B2 * | 5/2009 | Hasegawa et al. | 382/260 |
| 9,105,082 B2 * | 8/2015 | Kim | G06T 5/002 |
| 2008/0231753 A1 * | 9/2008 | Fujiwara et al. | 348/607 |
| 2009/0041371 A1 * | 2/2009 | Hasegawa | 382/261 |
| 2010/0034296 A1 * | 2/2010 | Cunha et al. | 375/240.29 |
| 2010/0177982 A1 * | 7/2010 | Hamada et al. | 382/264 |
| 2011/0019935 A1 * | 1/2011 | Kelm | G06T 5/50 382/275 |
| 2013/0163874 A1 * | 6/2013 | Shechtman | G06K 9/6211 382/190 |
| 2013/0202177 A1 * | 8/2013 | Bar-Aviv | G06T 11/008 382/131 |

FOREIGN PATENT DOCUMENTS

| | | |
|---|---|---|
| JP | 10-074259 | 3/1998 |
| JP | 2008-271492 A | 11/2008 |

(Continued)

OTHER PUBLICATIONS

Protter et al., "Generalizing the Nonlocal-Means to Super-Resolution Reconstruction," IEEE Transactions on Image Processing, vol. 18 No. 1, Jan. 2009, pp. 36-51.*

(Continued)

*Primary Examiner* — Matthew Bella
*Assistant Examiner* — Jose M Torres
(74) *Attorney, Agent, or Firm* — Harness, Dickey & Pierce, PLC (57) ABSTRACT

Provided are an apparatus and a method for high speed filtering of an image for high precision that may include a coordinate determining unit to determine coordinates (P,Q) on a screen with respect to a first pixel to be filtered, a pixel determining unit to determine a second pixel with coordinates including either P or Q, a block setting unit to set a first block comprising the first pixel, and a second block comprising the second pixel, and a processing unit to filter the first pixel by comparing the first block and the second block.

8 Claims, 4 Drawing Sheets

(56) References Cited

FOREIGN PATENT DOCUMENTS

| | | |
|---|---|---|
| JP | 2010-153969 A | 7/2010 |
| KR | 10-2006-0063480 | 6/2006 |
| KR | 10-2006-0082604 | 7/2006 |
| KR | 2006-0108994 A | 10/2006 |
| KR | 10-2007-0105534 | 10/2007 |
| KR | 10-2010-0035909 | 4/2010 |

OTHER PUBLICATIONS

Office Action for Korean Patent Application No. 10-2010-0080146 issued on Jan. 21, 2016 with partial English translation attached.

\* cited by examiner

FIG. 4 und APPARATUS AND METHOD FOR HIGH SPEED FILTERING OF IMAGE FOR HIGH PRECISION

CROSS-REFERENCE TO RELATED APPLICATIONS

This application claims the priority benefit of Korean Patent Application No. 10-2010-0080146, filed on Aug. 19, 2010, in the Korean Intellectual Property Office, the disclosure of which is incorporated herein by reference.

BACKGROUND

1. Field

Example embodiments of the present disclosure relate to an apparatus and a method for high speed filtering of an image for high precision that may reduce a number of a second block to be compared with a first block including a first pixel to be filtered, and thereby reduce an amount of calculation when filtering the first pixel.

2. Description of the Related Art

A conventional Non Local Means (NLM) filter apparatus may determine a first pixel to be filtered on a screen, and may determine $N^2$ total pixels located on the screen as a second pixel, N being a number of pixels on an edge of the screen. Then, the NLM filter apparatus may filter the first pixel by comparing a first block including the first pixel and a second block including the second pixel.

Here, $N^2$ number of calculations may be performed to filter a single pixel, and a filtering process may be complex and accordingly a great deal of time may be used for the filtering.

Thus, a technology for efficiently filtering using fewer calculations may be needed.

SUMMARY

The foregoing and/or other aspects are achieved by providing an apparatus for high speed filtering of an image for high precision, the apparatus including a coordinate determining unit to determine coordinates (P,Q) on a screen with respect to a first pixel to be filtered, a pixel determining unit to determine a second pixel with coordinates including either P or Q, a block setting unit to set a first block including the first pixel, and a second block including the second pixel, and a processing unit to filter the first pixel by comparing the first block and the second block.

The foregoing and/or other aspects are achieved by providing a method of high speed filtering of an image for high precision, the method including determining coordinates (P,Q) on a screen with respect to a first pixel to be filtered, determining a second pixel with coordinates including either P or Q, setting a first block comprising the first pixel, and a second block comprising the second pixel, and filtering the first pixel by comparing the first block and the second block.

Additional aspects of embodiments will be set forth in part in the description which follows and, in part, will be apparent from the description, or may be learned by practice of the disclosure.

Example embodiments may determine coordinates (P,Q) on a screen with respect to a first pixel to be filtered, determine a second pixel with coordinates including either P or Q, then compare a first block including the first pixel, and a second block including the second pixel, and filter the first pixel, thereby reducing a number of the second block to be compared with the first block, to be fewer than a number of blocks corresponding to total pixels located on a screen, and reducing an amount of calculation when filtering the first pixel.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein reference numerals refer to the like elements throughout. Embodiments are described below to explain the present disclosure by referring to the figures.

Figure 1:
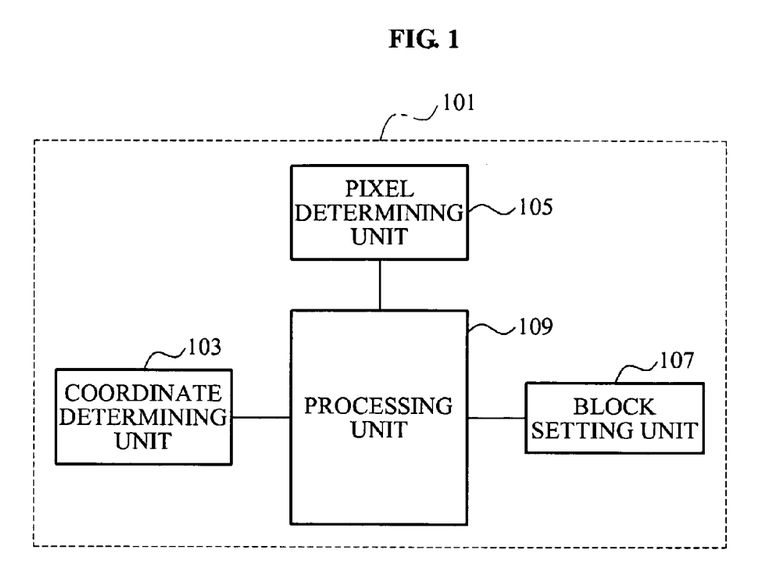
FIG. 1 illustrates an example of a configuration of an apparatus for high speed filtering of an image for high precision according to example embodiments.

FIG. 1 illustrates an example of a configuration of an apparatus for high speed filtering of an image for high precision according to example embodiments.

Referring to FIG. 1, the apparatus for high speed filtering of the image for high precision 101 may include, for example, a coordinate determining unit 103, a pixel determining unit 105, a block setting unit 107, and a processing unit 109.

The coordinate determining unit 103 may determine, as an example, coordinates (P, Q) on a screen with respect to a first pixel to be filtered.

The coordinate determining unit 103 may determine the coordinates (P,Q) of the first pixel on an edge of an image displayed on the screen. A direction of the edge may be parallel to an axial direction of P or an axial direction of Q, or may be a direction other than parallel to the axial direction of P or the axial direction of Q. Here, the axial direction of P may correspond to a direction of a virtual axis that may connect coordinates (P, variable) such as a direction of a vertical line that may pass through the first pixel, which will be referred to as an axial direction of P hereinafter. Also, the axial direction of Q may correspond to a direction of a virtual axis that may connect coordinates (variable, Q) such as a direction of a horizontal line that may pass through the first pixel, which will be referred to as an axial direction of Q hereinafter.

The determining of a second pixel based on whether the direction of the edge is parallel to the axial direction of P or the axial direction of Q will be further described.

When the edge is parallel to the axial direction of P or the axial direction of Q, the pixel determining unit 105 may determine a second pixel with coordinates including either P or Q.

For example, the pixel determining unit 105 may determine a second pixel of coordinates $(P,Q_1), (P,Q_2) \ldots, (P,Q_u)$ that may be vertically located in relation to the coordinates (P,Q), or a second pixel of coordinates $(P_1,Q), (P_2,Q) \ldots, (P_g,Q)$ that may be horizontally located to the coordinates (P,Q). Here, u of $Q_u$ may correspond to a number of pixels located on an edge of the screen, for example, vertically located on the screen, and v of $P_v$ may correspond to a number of pixels located on another edge of the screen, for example, horizontally located on the screen.

When a number of pixels located on the edge of a screen, or on another edge of the screen corresponds to N, a size of a window may correspond to N*1, N being a natural number.

When the edge is in a direction other than parallel with the axial direction of P or the axial direction of Q, for example, in a direction diagonal to the axial direction, the pixel determining unit 105 may determine a second pixel with coordinates including either P+m or Q+m, m being an integer.

For example, the pixel determining unit 105 may determine a second pixel of coordinates (P+m,$Q_1$), (P+m,$Q_2$) ..., (P+m,$Q_u$) that may be vertically located with respect to the coordinates (P,Q), or a second pixel of coordinates ($P_1$,Q+m), ($P_2$,Q+m) ..., ($P_u$,Q+m) that may be horizontally located with respect to the coordinates (P,Q).

When a number of pixels located on an edge of the screen, or on another edge of the screen corresponds to N, a size of a window may correspond to N*M, N being a natural number, and M being an absolute value of m.

The pixel determining unit 105 may select m so that any one of a second pixel with coordinates including P+m, and a second pixel with coordinates including Q+m is determined to be less than half of $N^2$ total pixels located on the screen. M corresponding to an absolute value of m may be less than N/2.

The block setting unit 107 may set a first block including the first pixel, and a second block including the selected second pixel. The block setting unit 107 may set a predetermined size of the first block and a predetermined size of the second block. Here, the first block and the second block may have a same size.

For example, the block setting unit 107 may set a 3*3 first block including a first pixel, and a 3*3 second block including a second pixel.

The processing unit 109 may filter the first pixel by comparing the first block and the second block. The processing unit 109 may calculate a weight with respect to the second block by comparing the first block and the second block, and may filter the first pixel based on the calculated weight and the second pixel.

The processing unit 109 may calculate a similarity $S_s^{i)}$ between the first block and the second block based on a pixel brightness difference between the first block and the second block, and may calculate a weight $W_s^{ii)}$ based on the calculated similarity. The processing unit 109 may calculate a similarity between the first block and the second block by calculating a difference of a brightness value between pixels existing at a same location as the first block and the second block, and by adding up the difference of the brightness value with respect to each pixel.

For example, when having a brightness value for each pixel of $$\begin{pmatrix} 1, & 2, & 3 \\ 2, & 2, & 4 \\ 0, & 0, & 1 \end{pmatrix}$$

as a 3*3 first block, and having a brightness value for each pixel of $$\begin{pmatrix} 0, & 2, & 3 \\ 2, & 1, & 4 \\ 0, & 0, & 1 \end{pmatrix}$$

as a 3*3 second block, the processing unit 109 may calculate (|1−0|+|2−2|+|3−3|+|2−2|+|2−1|+|4−4|+|0−0|+|0−0|+|1−1|/9)=0.2 as a similarity between the first block and the second block.

The similarity $S_s^{i)}$ may be expressed as Equation 1.

$$s_s(x, y, x_u, y_v) = s_y(x, y, x, y_v) + s_x(x, y_v, x_u, y_v) \quad \text{[Equation 1]}$$

$$= \sum_j \sum_i \|f(x+i, y+j) - f(x+i, y_v+j)\|^2 +$$

$$\sum_j \sum_i \|f(x+i, y_v+j) - f(x_u+i, y_v+j)\|^2$$

Also, the weight $W_s^{ii)}$ may be inversely proportional to the similarity $S_s^{i)}$, and may be expressed as Equation 2.

$$w_s(x,y,x_u,y_v)) = w_y(x,y,x,y_v) \cdot w_x(x,y_v,x_u,y_v) \quad \text{[Equation 2]}$$

Consequently, the processing unit 109 may filter the first pixel by adjusting a brightness value of the first pixel using a value obtained by calculating a brightness value of a second pixel in the second block, and the calculated weight.

Particularly, when a plurality of second blocks are set, the processing unit 109 may adjust a brightness value of a first pixel in a first block by multiplying a brightness value of a second pixel in each of the second blocks, and a weight with respect to the second block, and by calculating an average of the multiplied brightness values. For example, when a brightness value of a second pixel in a second block_#1 corresponds to '2', a brightness value of a second pixel in a second block_#2 corresponds to '2', a brightness value of a second pixel in a second block_#3 corresponds to '1', and a weight of each of a second block_#1, a second block_#2, and a second block_#3 respectively correspond to '1', '0.5', and '0.3', the processing unit 109 may filter the first pixel by adjusting a brightness value of the first pixel of the first block as (2*1)+(2*0.5)+(1*0.3)/3=1.1.

The value of filtering the first pixel may be expressed as Equation 3.

$$\bar{f}(x, y) = \sum_v w_y(x, y, x, y_v) \sum_u w_x(x, y_v, x_u, y_v) \cdot f(x_u, y_v) \quad \text{[Equation 3]}$$

Here, (x,y) correspond to coordinates of the first pixel, and ($x_u$,$y_v$) correspond to coordinates of the second pixel.

A conventional Non Local Means (NLM) filter apparatus may determine a first pixel (P,Q) to be filtered on a screen, determine each of pixels, for example, ($P_1$,$Q_1$), ($P_1$,$Q_2$) ..., ($P_1$,$Q_u$), ($P_2$,$Q_1$), ($P_2$,$Q_2$) ..., ($P_2$,$Q_u$) ... ($P_v$,$Q_1$), ($P_v$,$Q_2$) ..., ($P_v$,$Q_u$) as a second pixel, then compare a first block including the first pixel, and a second block including the second pixel, and filter the first pixel.

Here, a similarity S between the first block and the second block may be expressed as Equation 4.

$$s(x, y, x_u, y_v) = \sum_j \sum_i \|f(x+i, y+j) - f(x_u+i, y_v+j)\|^2 \quad \text{[Equation 4]}$$

Here, (x, y) corresponds to coordinates of the first pixel, and $(x_u, y_v)$ corresponds to coordinates of the second pixel. Also, f(x+i,y+j) corresponds to a brightness value of a pixel in the first block, and $f(x_u+i, y_v+j)$ corresponds to a brightness value of a pixel in the second block.

A weight w with respect to the second block may be expressed as Equation 5.

$$w(x, y, x_u, y_v) \propto \exp\left(-\frac{s(x, y, x_u, y_v)}{\sigma^2}\right) \quad \text{[Equation 5]}$$

The value of filtering the first pixel may be expressed as Equation 6.

$$\bar{f}(x, y) = \sum_v \sum_u w(x, y, x_u, y_v) \cdot f(x_u, y_v) \quad \text{[Equation 6]}$$

Equation 7 may be derived from Equation 1 and Equation 4.

$$s(x, y, x_u, y_v) =$$
$$s_s(x, y, x_u, y_v) + \sum_j \sum_i 2(f(x+i, y+j) - f(x+i, y_v+j)) \quad \text{[Equation 7]}$$
$$(f(x+i, y_v+j) - f(x_u+i, y_v+j))$$

When a pattern is similar along an axial direction of Y, or similar in an axial direction of Y, it may come to f(x+i,y+j)−f(x+i,y$_v$+j)≈0, and accordingly s(x,y,x$_u$,y$_v$)≈s$_s$(x,y,x$_u$,y$_v$) may be completed.

Also, when a pattern is similar along an axial direction of X, or similar in an X axial direction, it may come to f(x+i,y$_v$+j)−f(x$_u$+i,y$_v$+j)≈0, and accordingly s(x,y,x$_u$,y$_v$)≈s$_s$(x,y,x$_u$,y$_v$) may be completed.

Consequently, an apparatus for high speed filtering of an image for high precision may derive a performance of filtering results similar to the conventional NLM filter apparatus, however, the apparatus for high speed filtering of the image for high precision may efficiently perform the filtering using relatively fewer calculations, thereby simplifying the filtering and accordingly reducing a time used for the filtering.

That is, when a size of a screen corresponds to N*N, the conventional NLM filter apparatus may perform $N^2$ number of calculations, whereas the apparatus for high speed filtering of the image for high precision may perform 2N number of calculations, here, a size of a window corresponds to N*1, thereby deriving a performance of filtering result similar to the conventional NLM filter apparatus, N being a natural number. When, an edge of an image displayed on a screen is formed in a diagonal direction, as the window size is set to N*M, the apparatus for high speed filtering of the image for high precision may perform 2MN number of calculations, thereby deriving a performance of filtering result similar to the conventional NLM filter apparatus.

Figure 2:
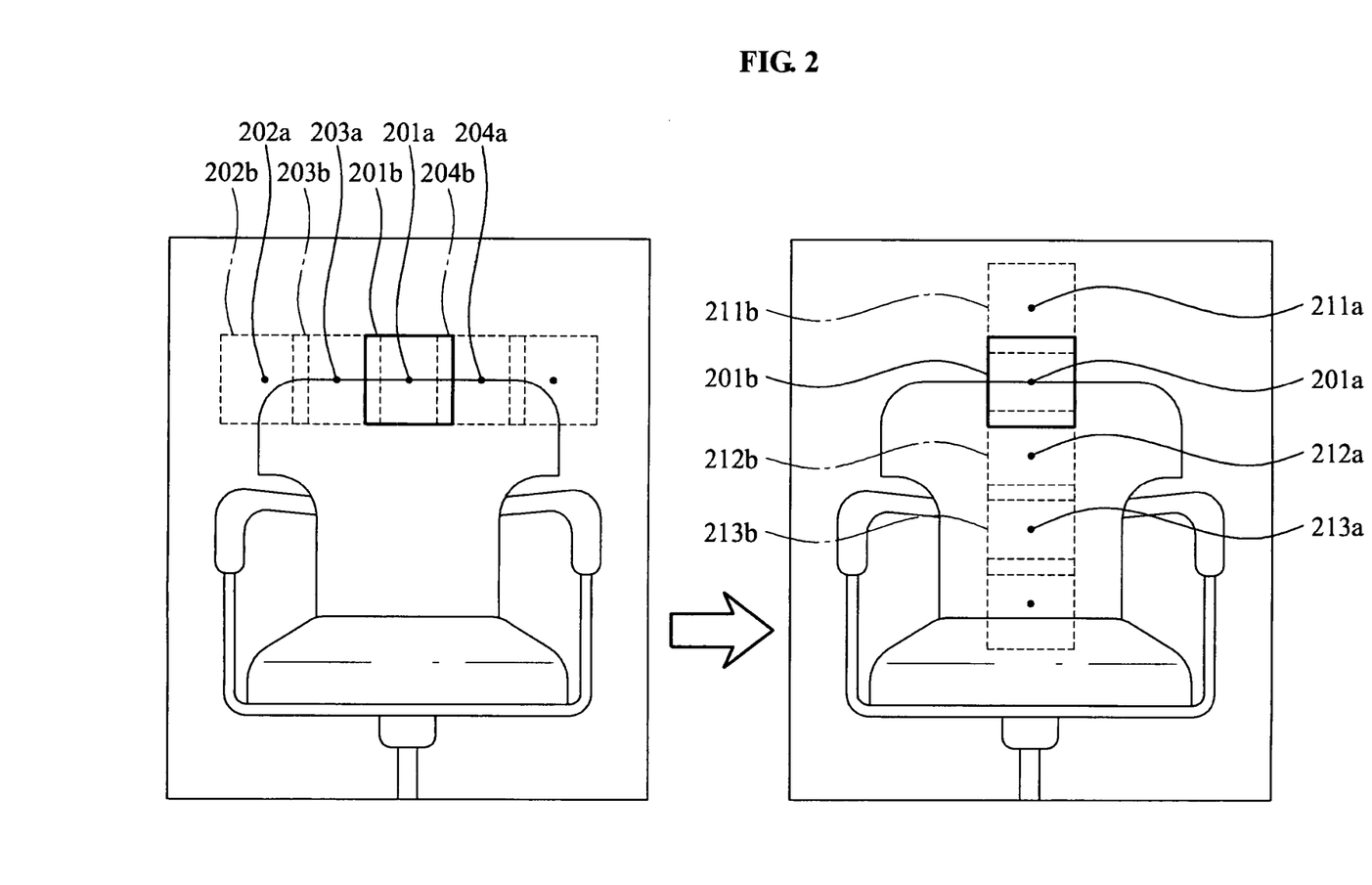
FIG. 2 illustrates a diagram to describe an example of filtering in an apparatus for high speed filtering of an image for high precision according to example embodiments.

FIG. 2 illustrates a diagram to describe an example of filtering in an apparatus for high speed filtering of an image for high precision according to example embodiments.

Referring to FIG. 2, the apparatus for high speed filtering of the image for high precision may determine coordinates (P,Q) on a screen with respect to a first pixel to be filtered, determine a second pixel with coordinates including either P or Q, and then filter the first pixel by comparing a first block including the first pixel and a second block including the second pixel. Here, the apparatus for high speed filtering of the image for high precision may determine the coordinates (P,Q) of the first pixel on an edge of an image displayed on the screen.

For example, the apparatus for high speed filtering of the image for high precision may determine coordinates (P,Q) on a screen with respect to a first pixel 201a to be filtered, and determine either one of a second pixel_#1 202a, a second pixel_#2 203a, and a second pixel_#3 204a with coordinates including Q, or one of a second pixel_#4 211a, a second pixel_#5 212a, and a second pixel_#6 213a with coordinates including P.

The apparatus for high speed filtering of the image for high precision may set a first block 201b including the first pixel 201a, and a second block_#1 through a second block_#6 (202b, 203b, 204b, 211b, 212b, and 213b) including the second pixel_#1 through the second pixel_#6 (202a, 203a, 204a, 211a, 212a, and 213a), and may filter the first pixel 201a by comparing the first block 201b and each of the second block_#1 through the second block_#6 (202b, 203b, 204b, 211b, 212b, and 213b).

That is, the apparatus for high speed filtering of the image for high precision may calculate a similarity $S_1$ between the first block 201b and the second block_#1 202b, a similarity $S_2$ between the first block 201b and the second block_#2 203b, . . . , and a similarity $S_6$ between the first block 201b and the second block_#6 213b, may calculate a weight $W_1$ through $W_6$ with respect to the second block_#1 through the second block_#6 based on the similarity $S_1$ through $S_6$, may multiply a brightness value of each of the second pixel_#1 through the second pixel_#6 (202a, 203a, 204a, 211a, 212a, and 213a) and the weight of each of $W_1$ through $W_6$, then may calculate an average of the brightness values obtained by multiplication, and thereby may adjust a brightness value of the first pixel 201a of the first block 201b.

Figure 3:
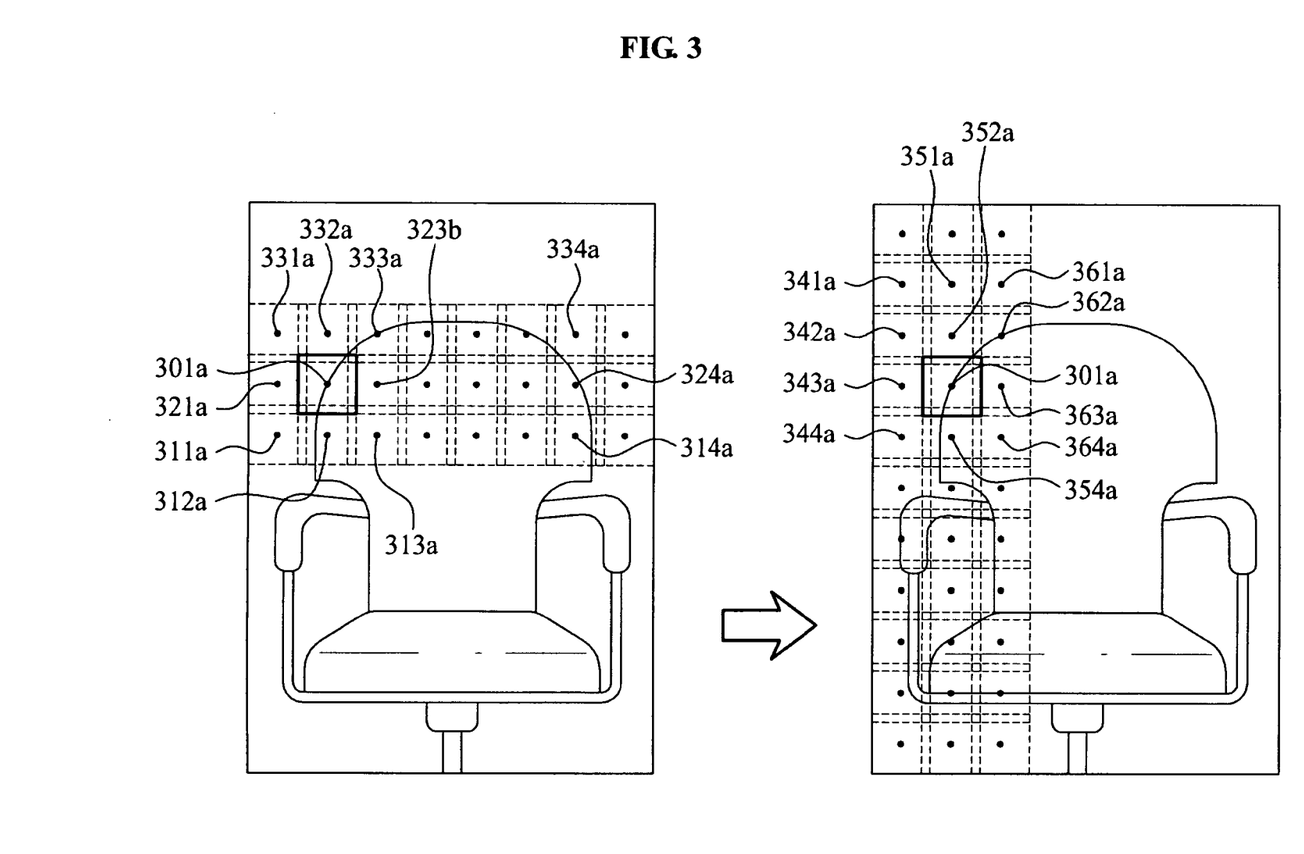
FIG. 3 illustrates a diagram to describe another example of filtering in an apparatus for high speed filtering of an image for high precision according to example embodiments.

FIG. 3 illustrates a diagram to describe another example of filtering in an apparatus for high speed filtering of an image for high precision according to example embodiments.

Referring to FIG. 3, the apparatus for high speed filtering of the image for high precision may determine coordinates (P,Q) on a screen with respect to a first pixel to be filtered and when a direction of an edge of an image including the first pixel on the screen is in a direction other than parallel to an axial direction of P or an axial direction of Q. As an example, a diagonal direction, may determine a second pixel with coordinates including either P+m or Q+m, m being an integer.

For example, the apparatus for high speed filtering of the image for high precision may determine coordinates (P,Q) on a screen with respect to a first pixel 301a to be filtered, and when a direction of an edge of an image including the first pixel on the screen is in a direction other than parallel to an axial direction of P or an axial direction of Q, for example, a diagonal direction, may determine a second pixel with coordinates including either one of Q−1, Q, and Q+1, or one of P−1, P, and P+1, m being one of −1, 0, and 1.

That is, the apparatus for high speed filtering of the image for high precision may determine either one of a second pixel_#1_1 through a second pixel_#1_4 (311a through 314a) with coordinates including Q−1, a second pixel_#2_1 through a second pixel_#2_4 (321*a*, 323*a*, and 324*a*) with coordinates including Q, and a second pixel_#3_1 through a second pixel_#_4 (331*a* through 334*a*) with coordinates including Q+1, or one of a second pixel_#4_1 through a second pixel_#4_4 (341*a* through 344*a*) with coordinates including P−1, a second pixel_#5-1 through a second pixel_#5_4 (351*a*, 352*a*, and 354*a*) with coordinates including P, and a second pixel_#6_1 through a second pixel_#6_4 (361*a*, 362*a*, and 364*a*) with coordinates including P+1.

Then, the apparatus for high speed filtering of the image for high precision may filter the first pixel 301*a* by comparing a first block including the first pixel 301*a*, and a second block including the second pixel (311*a* through 314*a*, 321*a*, 323*a*, 324*a*, 331*a* through 334*a*, 341*a* through 344*a*, 351*a*, 352*a*, 354*a*, 361*a*, 362*a*, and 364*a*).

Figure 4:
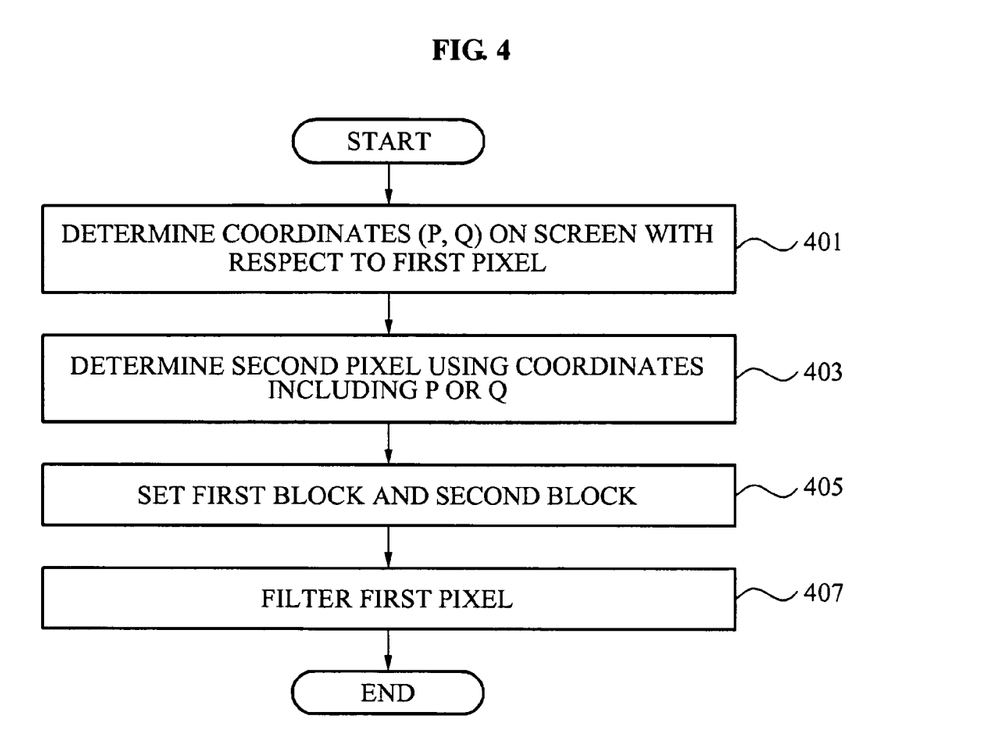
FIG. 4 illustrates a flowchart to describe a method of high speed filtering of an image for high precision.

FIG. 4 illustrates a flowchart to describe a method of high speed filtering of an image for high precision. The method may be performed by the apparatus for high speed filtering of the image for high precision or by the apparatus for high speed filtering of a high precision image or by a general purpose computer or processor.

Referring to FIG. 4, coordinates (P,Q) may be determined on a screen with respect to a first pixel to be filtered in operation 401.

The coordinates (P,Q) of the first pixel may be determined on an edge of an image displayed on the screen. Here, a direction of the edge may be parallel with either an axial direction of P, for example, a vertical direction, or an axial direction of Q, for example, a horizontal direction, or may be in a direction other than parallel with either the axial direction of P or the axial direction of Q.

In operation 403, a second pixel may be determined using coordinates including either P or Q.

When the direction of the edge of the image where the first pixel is located is parallel with either the axial direction of P or the axial direction of Q, a second pixel may be determined with coordinates including either P or Q.

Also, when the direction of the edge of the image where the first pixel is located is different in a direction other than parallel with either the axial direction of P or the axial direction of Q, a second pixel may be determined with coordinates including either P+m or Q+m, m being an integer.

Here, m may be selected so that any one of a second pixel with coordinates including P+m, and a second pixel with coordinates including Q+m is determined to be less than a half of 2N total pixels located on the screen. M corresponding to an absolute value of m may be less than N/2.

In operation 405, a first block may be set including the first pixel, and a second block including the selected second pixel.

A predetermined size of the first block and the second block may be set. Here, the first block and the second block may have a same size.

In operation 407, the the first pixel may be filtered by comparing the first block and the second block.

A weight may be calculated with respect to the second block by comparing the first block and the second block and the first pixel may be filtered based on the calculated weight and the second pixel.

A similarity may be calculated between the first block and the second block based on a pixel brightness difference between the first block and the second block and the weight may then be calculated based on the calculated similarity. Here, a difference may be calculated of brightness values between pixels existing at a same location of the first block and the second block, and a similarity between the first block and the second block may then be calculated by adding up the difference of the brightness value with respect to each of the pixels.

Consequently, the first pixel may be filtered by adjusting a brightness value of the first pixel using a value obtained by calculating the brightness value of the second pixel and the weight.

When a plurality of second blocks is set, a brightness value of the first pixel of the first block may be adjusted by multiplying a brightness value of a second pixel of each of the second blocks and a weight with respect to the second block, and an average of the brightness values obtained by multiplication may be calculated.

The apparatus and method for high speed filtering of the image for high precision may determine coordinates (P,Q) on a screen with respect to a first pixel to be filtered, may determine a second pixel with coordinates including either P or Q, then may filter the first pixel by comparing a first block including the first pixel, and a second block including the second pixel, thereby reducing a number of a second block to be compared with the first block to be less than a number of blocks corresponding to total pixels located on the screen, and reducing an amount of calculation when filtering the first pixel.

The apparatus and the method for high speed filtering of an image for high precision according to the above-described embodiments may be recorded in non-transitory computer-readable media including program instructions to implement various operations embodied by a computer. The media may also include, alone or in combination with the program instructions, data files, data structures, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for high speed filtering of the image for high precision described herein. The apparatus for high speed filtering of the image for high precision may include at least one processor to control one or more of the processor-executable units.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for high speed filtering of an image for high precision, the apparatus comprising:
a coordinate determining unit configured to determine coordinates (P,Q) of a first pixel on an edge of an image displayed on a screen;
a pixel determining unit configured to determine second pixels with coordinates from (P,Q1) to (P,Qu) and coordinates from (P1,Q) to (Pv,Q), in response to the direction of the edge being in a direction other than parallel to the axial direction of P and the axial direction of Q, where u of Qu corresponds to a number of pixels located on a vertical side of the screen and v of Pv corresponds to a number of pixels located on a horizontal side of the screen, and, to determine the second pixel with coordinates including either P+m or Q+m in response to the direction of the edge being in a direction other than parallel to the axial direction of P and the axial direction of Q, m being an integer; and a processing unit configured to compare a first block including the first pixel and a second block including the second pixels, to calculate a weight with respect to the second block based on the comparison, and to filter the first pixel by adjusting a brightness value of the first pixel using a value obtained by multiplying a brightness value of the second pixels and the weight.

2. The apparatus of claim 1, wherein the pixel determining unit is configured such that the pixel determining unit selects m so that any one of second pixels with coordinates including P+m, and with coordinates including Q+m is determined to be less than a half of a total quantity of pixels located on the screen.

3. The apparatus of claim 1, wherein the processing unit is configured such that the processing unit calculates a similarity between the first block and the second block based on a pixel value difference between the first block and the second block, and calculates the weight based on the calculated similarity.

4. The apparatus of claim 1, further comprising a block setting configured to set the first block comprising the first pixel and the second block comprising the second pixels.

5. A method for high speed filtering of an image for high precision, the method comprising:
    determining coordinates (P,Q) of a first pixel on an edge of and image displayed on a screen;
    determining second pixels with coordinates from (P,Q1) to (P,Qu) and coordinates from (P1,Q) to (Pv,Q), in response to a direction of the edge being parallel to one of an axial direction of P and an axial direction of Q, where u of Qu corresponds to a number of pixels located on a vertical side of the screen and v of Pv corresponds to a number of pixels located on a horizontal side of the screen, and determining the second pixel with coordinates including either P+m or Q+m in response to the direction of the edge being in a direction other than parallel to the axial direction of P and the axial direction of Q, m being an integer;
    comparing a first block including the first pixel and a second block including the second pixels;
    calculating a weight with respect to the second block based on the comparing; and
    filtering, using a processor, the first pixel by adjusting a brightness value of the first pixel using a value obtained by multiplying a brightness value of the second pixels and the weight.

6. The method of claim 5, wherein the determining of the second pixels selects m so that any one of second pixels with coordinates including P+m, and second pixels with coordinates including Q+m is determined to be less than a half of a total quantity of pixels located on the screen.

7. The method of claim 5, wherein the calculating of the weight with respect to the second block comprises:
    calculating a similarity between the first block and the second block based on a pixel value difference between the first block and the second block; and
    calculating the weight based on the calculated similarity.

8. The method of claim 5, further comprising setting the first block comprising the first pixel and the second block comprising the second pixels.

* * * * *